T. Mitchell,
Making Brush Handles,
No. 749, Reissued June 28, 1859.
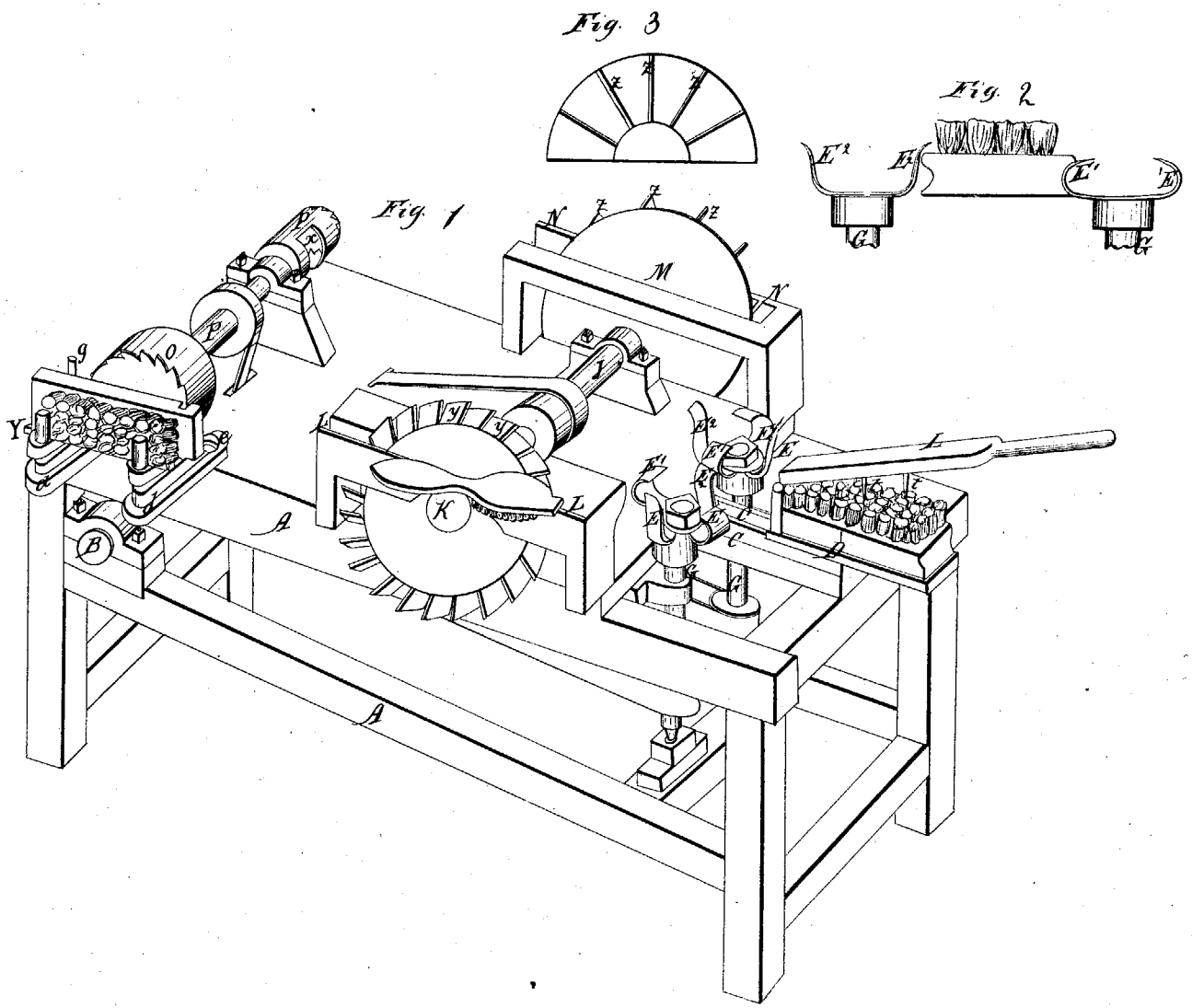
Witnesses.
E. Snell
Thos Wenck Dettitt
Inventor
Thomas Mitchell
AM. PHOTO-LITHO. CO. N.Y. (OSBORNE'S PROCESS)

UNITED STATES PATENT OFFICE.

JOHN AMES, OF LANSINGBURG, NEW YORK, ASSIGNEE OF THOMAS MITCHELL.

IMPROVED MACHINE FOR FINISHING BRUSH-HANDLES.

Specification forming part of Letters Patent No. 17,631, dated June 23, 1857; Reissue No. 749, dated June 28, 1859.

*To all whom it may concern:*

Be it known that THOMAS MITCHELL, of Lansingburg, in the county of Rensselaer and State of New York, did obtain Letters Patent of the United States for certain machinery to be used in the manufacture of brushes for the purpose of shaping the stock after the bristles have been set therein, which Letters Patent are dated June 23, 1857; and whereas I, JOHN AMES, of Lansingburg, aforesaid, have, by assignment duly recorded in the patent, become the owner of the whole right and title to the said invention, do hereby, for the purpose of obtaining a reissue, declare the following to be a full, clear, and exact description thereof.

Figure 1: A A is a strong frame or bench to which the various pieces of machinery are attached, being operated by band-pulleys or drums attached to the shaft B, the drums not being shown in the drawing.

C C are two parallel guides raised a little above the front edge of the bench, and extending backward therefrom. On the top of them slides a platform, D, upon which the brush to be operated upon is laid. These guides pass between cutters E′ E″, attached to a pair of vertical shafts, G G, and of course revolving horizontally. These cutters are to form the molding or edges of the sides of the brush, as shown in Fig. 2, which represents a cross-section of the brush with one of each kind of cutter operating on its stock, the cutters of two different forms, E′ and E″, E′ being shaped to form the lower part of the molding and E″ being the upper, as the brush lies on D, bristles uppermost. The cutters may be varied to give variety to the molding.

To hold the brush firmly down, a lever, L, hinged to an upright standard on the rear of D, is used, the part of the brush carrying several metal points or teeth, *t t t*, which pass through the bristles and hold into the stock. By this handle the platform with brush is passed through between the revolving cutters and back again.

To finish the end of the stock, and to cut out the necks of the stocks, a crown-wheel saw, O, which is a true cylinder, whose circumference is of a proper curve, is attached to a shaft, H. In front of the wheel two projecting arms, *d d*, slotted so as to be adjustable by set-screws *e* on the table to or from the saw, support by two uprights, *f f*, a platform, Y Y, adjustable higher or lower, as desired; also, by the movement of the arms *d d*, at any angle with the saw. On this platform Y Y the brush is laid with one end against a stop, *g*, to keep it from the saw, and the other is then brought against the saw, which trims that end. The brush is then turned and the other end cut in the same manner. Across the center of the bench is a shaft, J, carrying at one end a cutter-wheel, K, with knives *y y* set around its periphery at an oblique angle with the plane of the wheel, and having also an oblique pitch or inclination forward. This wheel is used for trimming the edges of curved brushes, which are applied to it, in the manner illustrated in the drawings, by a hair brush in position for being cut, the bristles lying against the edge of a guard or gage piece, L, attached to the bench and placed in such a position relatively with wheel K, as shown in the drawings, that by turning the brush, using the bristles as a guide, a proper form is given the stock.

M, also a cutter-wheel, a vertical semi of which is given in Fig. 3, has a set of thin knives, Z Z Z, placed radially and at right angles to the plane of the wheel. This is used to finish the sides of rectangularly-shaped brushes, the brush being applied with its bristles against a gage-board, N N, in manner similar to that operation at cutter-wheel K.

I do not claim the crown-wheel saw O, when separately considered; but,

Having thus described my invention, what I do claim as new, and desire to secure by Letters Patent, is—

1. The combination of the crown-wheel saw O with the adjustable platform Y Y and stop *g*, substantially as and for the purpose set forth.

2. The wheel K, provided with the oblique cutters *y*, in combination with the guard or gage-piece L, the cutter-wheel and gage piece being arranged relatively with each other substantially as and for the purpose set forth.

3. The arrangement and combination of mechanical devices herein set forth and described—to wit, the platform D, with revolving cutters, shaped and operating as described, crown-saw O, with the arms *d d*, and the adjustable platform and cutter-wheels K and M, with their cutters, substantially as described.

JOHN AMES.

Witnesses:
A. R. HAIGHT,
J. W. COOMB.